United States Patent
Arora et al.

(10) Patent No.: US 12,457,493 B1
(45) Date of Patent: Oct. 28, 2025

(54) MANAGING OPERATION OF A DATA PROCESSING SYSTEM FOR SHARED WIRELESS CONNECTION

(71) Applicant: Dell Products L.P., Round Rock, TX (US)

(72) Inventors: Mohit Arora, Frisco, TX (US); Abeye Teshome, Austin, TX (US); Richard M. Tonry, Georgetown, TX (US); Bassem El-Azzami, Austin, TX (US); Vinodkumar Vasudev Ottar, McKinney, TX (US); Luis Antonio Valencia Reyes, Waxahachie, TX (US); Adolfo Sandor Montero, Pflugerville, TX (US); Rajaravi Chandra Kollarapu, Allen, TX (US)

(73) Assignee: Dell Products L.P., Round Rock, TX (US)

( * ) Notice: Subject to any disclaimer, the term of this patent is extended or adjusted under 35 U.S.C. 154(b) by 38 days.

(21) Appl. No.: 18/649,206

(22) Filed: Apr. 29, 2024

(51) Int. Cl.
*H04W 12/037* (2021.01)
*H04L 9/30* (2006.01)
*H04W 12/08* (2021.01)

(52) U.S. Cl.
CPC ......... *H04W 12/037* (2021.01); *H04L 9/3073* (2013.01); *H04W 12/08* (2013.01)

(58) Field of Classification Search
None
See application file for complete search history.

(56) References Cited

U.S. PATENT DOCUMENTS

| | | | |
|---|---|---|---|
| 7,969,909 B2 * | 6/2011 | Oerton | H04W 48/16 370/254 |
| 8,042,182 B2 | 10/2011 | Milani Comparetti et al. | |
| 8,477,647 B2 * | 7/2013 | Tamura | H04W 48/18 370/252 |
| 8,533,345 B2 * | 9/2013 | Fedotenko | H04W 4/029 709/227 |
| 8,538,023 B2 * | 9/2013 | Yao | H04L 9/3228 455/435.1 |
| 8,615,785 B2 | 12/2013 | Elrod et al. | |
| 8,924,620 B2 | 12/2014 | Harriman et al. | |
| 9,215,244 B2 | 12/2015 | Ayyagari et al. | |
| 9,319,967 B2 * | 4/2016 | Jonker | H04W 48/16 |
| 9,734,169 B2 | 8/2017 | Redlich et al. | |
| 9,980,213 B2 * | 5/2018 | Lynch | H04W 28/0268 |
| 10,176,308 B2 | 1/2019 | Mintz et al. | |

(Continued)

*Primary Examiner* — Backhean Tiv
(74) *Attorney, Agent, or Firm* — WOMBLE BOND DICKINSON (US) LLP

(57) ABSTRACT

Methods and systems for managing a data processing system for shared wireless connection operation are disclosed. The method may include establishing wireless connection profiles for use in wireless communications by hardware resources of the data processing system. The wireless connection profiles may be securely synchronized with a cache hosted by a management controller of the data processing system. To do so, wireless connection profiles may be securely transmitted by an operating system agent to the management controller using a key pair controlled by the management controller. The wireless connection profiles may also be securely synchronized with a second data processing system to utilize a shared wireless connection profile with the first data processing system in operation.

20 Claims, 9 Drawing Sheets

(56) References Cited

U.S. PATENT DOCUMENTS

| | | | |
|---|---|---|---|
| 10,298,670 | B2 | 5/2019 | Ben-Shael et al. |
| 10,341,939 | B2* | 7/2019 | Peng .................... H04W 48/08 |
| 10,362,608 | B2* | 7/2019 | Gorajala Chandra ...................... H04W 48/14 |
| 10,671,765 | B2 | 6/2020 | Swierk et al. |
| 11,036,902 | B2 | 6/2021 | Nicholas |
| 11,102,122 | B2 | 8/2021 | Seed et al. |
| 11,134,380 | B2 | 9/2021 | Fox et al. |
| 11,399,283 | B2* | 7/2022 | Anantha ............. H04L 63/0892 |
| 11,487,274 | B2 | 11/2022 | Valder et al. |
| 11,792,267 | B2 | 10/2023 | Kreiner et al. |
| 12,302,236 | B2* | 5/2025 | Grayson .............. H04W 12/06 |
| 2009/0197571 | A1* | 8/2009 | Kitajima ........... H04W 12/0431 455/411 |
| 2011/0087387 | A1 | 4/2011 | Safa-Bakhsh et al. |
| 2014/0366105 | A1* | 12/2014 | Bradley ................ H04W 76/14 726/5 |
| 2018/0039946 | A1 | 2/2018 | Bolte et al. |
| 2021/0034048 | A1 | 2/2021 | Hajizadeh |
| 2021/0073211 | A1 | 3/2021 | Wright, Sr. |
| 2022/0038659 | A1 | 2/2022 | Michel |
| 2025/0138839 | A1* | 5/2025 | Teshome ............... H04L 67/306 |
| 2025/0138945 | A1* | 5/2025 | Teshome ............. G06F 11/1451 |
| 2025/0139298 | A1* | 5/2025 | Ottar ........................ G06F 21/73 |
| 2025/0141814 | A1* | 5/2025 | Montero ............... H04L 47/781 |
| 2025/0141880 | A1* | 5/2025 | Teshome ............... H04L 63/107 |
| 2025/0142444 | A1* | 5/2025 | Arora ............... H04W 28/0247 |
| 2025/0245059 | A1* | 7/2025 | Kollarapu ............. G06F 9/5044 |
| 2025/0245353 | A1* | 7/2025 | Montero ............... G06F 21/602 |
| 2025/0247670 | A1* | 7/2025 | Montero ............... H04W 4/029 |
| 2025/0247703 | A1* | 7/2025 | El-Azzami .......... H04W 12/037 |

\* cited by examiner

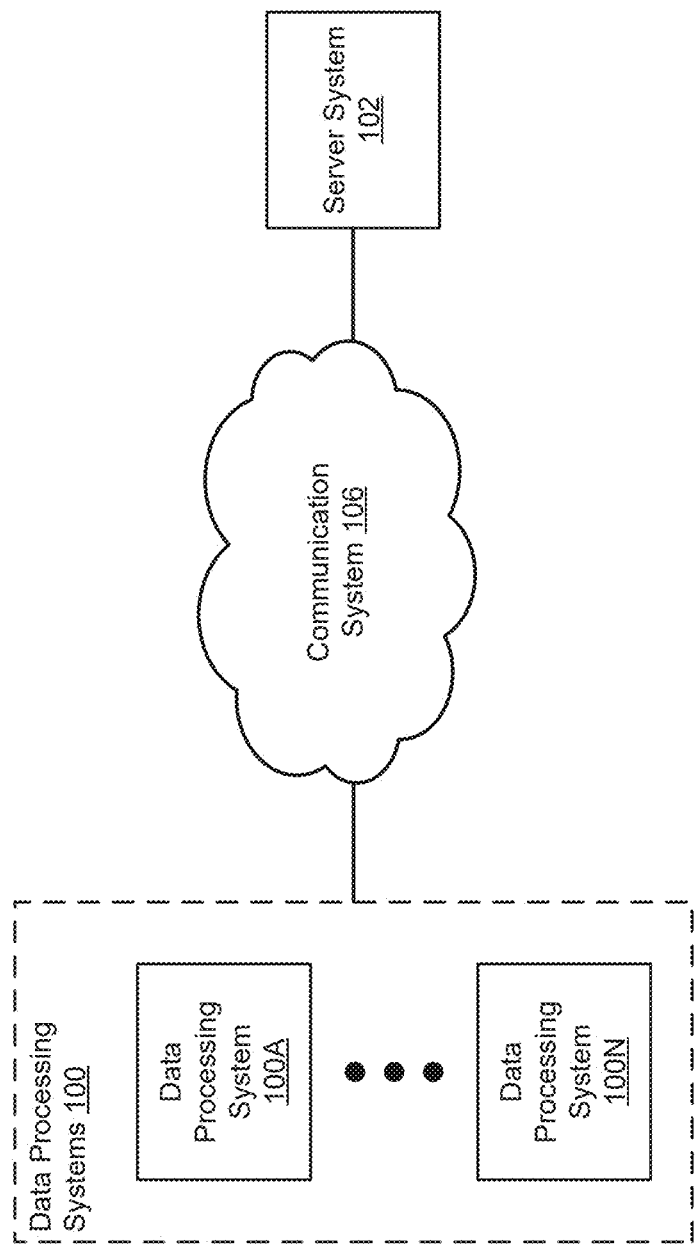

MANAGING OPERATION OF A DATA PROCESSING SYSTEM FOR SHARED WIRELESS CONNECTION

FIELD

Embodiments disclosed herein relate generally to managing a data processing system for shared wireless connection operation. More particularly, embodiments disclosed herein relate to managing a data processing system for shared wireless connection operation by securely synchronizing wireless connection profiles via an out-of-band communication channel.

BACKGROUND

Computing devices may provide computer-implemented services. The computer-implemented services may be used by users of the computing devices and/or devices operably connected to the computing devices. The computer-implemented services may be performed with hardware components such as processors, memory modules, storage devices, and communication devices. The operation of these components and the components of other devices may impact the performance of the computer-implemented services.

BRIEF DESCRIPTION OF THE DRAWINGS

Embodiments disclosed herein are illustrated by way of example and not limitation in the figures of the accompanying drawings in which like references indicate similar elements.

FIGS. 1A-1C show diagrams illustrating a system in accordance with an embodiment.

DETAILED DESCRIPTION

Figure 1B:
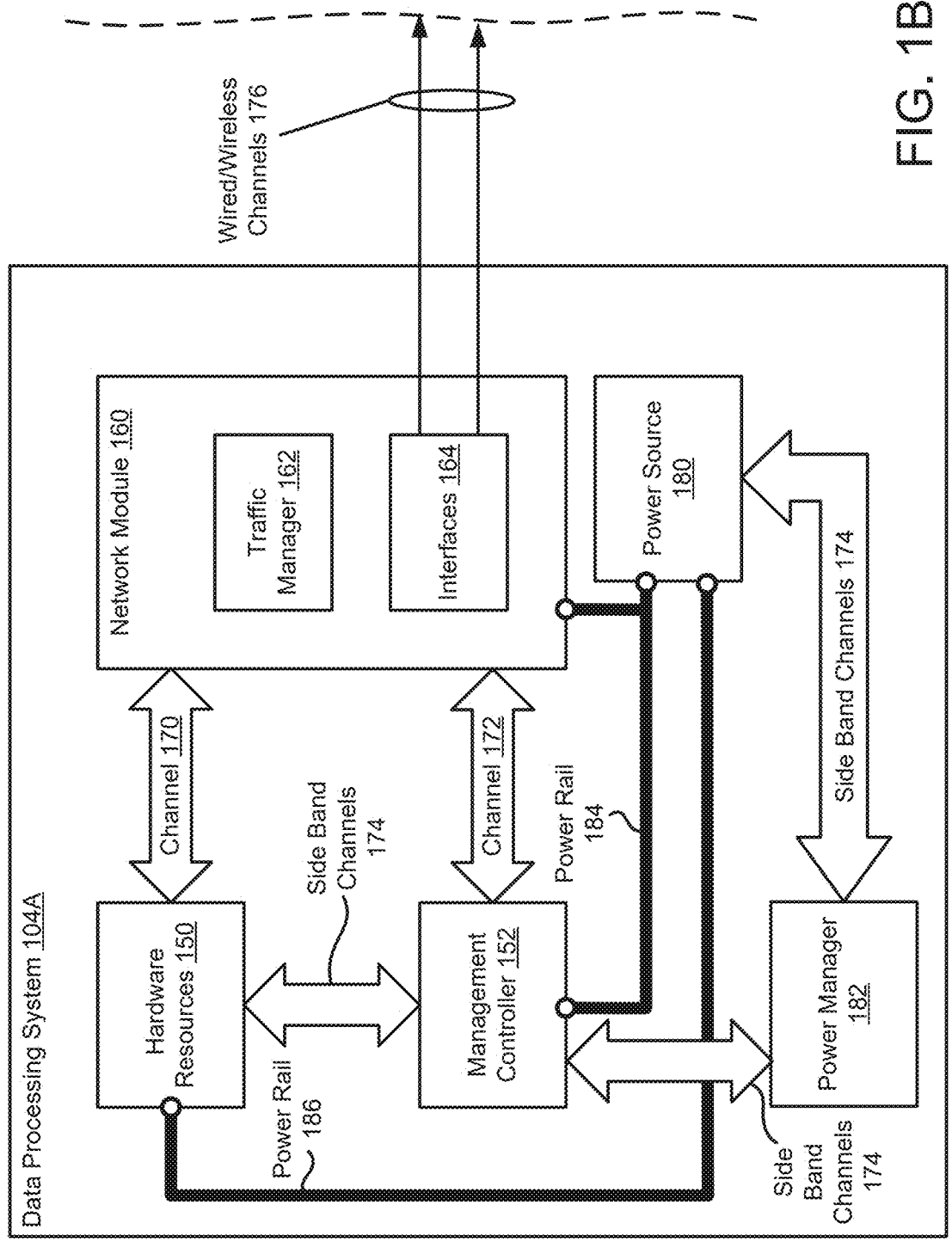

Various embodiments will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment. The appearances of the phrases "in one embodiment" and "an embodiment" in various places in the specification do not necessarily all refer to the same embodiment.

References to an "operable connection" or "operably connected" means that a particular device is able to communicate with one or more other devices. The devices themselves may be directly connected to one another or may be indirectly connected to one another through any number of intermediary devices, such as in a network topology.

In general, embodiments disclosed herein relate to methods and systems for managing a data processing system for shared wireless connection operation. The data processing system may provide computer-implemented services to any type and number of other devices and/or users of the data processing system. The computer-implemented services may include any quantity and type of such services.

To provide the computer-implemented services, the data processing system may connect to different wireless networks at different times. To connect to a wireless network, hardware resources (e.g., an operating system) of the data processing system may employ a wireless connection profile (e.g., a wireless local-area network (WLAN) profile) configured to provide information necessary to establish a connection to the wireless network (e.g., credentials, security settings, etc.). One or more wireless connection profiles corresponding to the different wireless networks may be stored and used by the hardware resources of the data processing system.

The data processing system may include and utilize the hardware resources (e.g., in-band components of the data processing system) to manage operation. Because the hardware resources may be inoperable under certain conditions (e.g., an unavailability of at least a portion of the hardware resources), operation of the data processing system may also be managed by out-of-band components that may communicate with a server system via an out-of-band communication channel. The out-of-band components and the out-of-band communication channel may function independently from in-band components. To manage operation of the data processing system via the out-of-band communication channel, a management controller of the data processing system may also require a connection to a wireless network (e.g., the same wireless connection established by the hardware resources of the data processing system).

However, the management controller may be unable to establish a wireless connection for managing the data processing system in a trusted manner. For example, an interface may not be provided for the management controller to configure desired wireless connections, and/or a distinct wireless connection established by the management controller may limit information communicable to the management controller. Furthermore, additional data processing systems may cooperatively or individually provide a portion of the computer-implemented services and may also require a shared wireless connection (e.g., same as the wireless connection established by the first data processing system) to operate.

To improve a quality and/or availability of computer-implemented services provided by using a wireless connection, wireless connection profiles may be securely shared between hardware resources of a data processing system, a management controller of the data processing system, and/or a second data processing system.

Any number of wireless connection profiles may be created by and stored in hardware resources (e.g., an operating system) of the data processing system. A wireless connection profile may include information relevant to establishing a shared wireless connection. For example, the wireless connection profile may include credentials (e.g., username, password, etc.), security settings, session identifiers, and/or any other information.

The wireless connection profiles may be selectively and securely transmitted to a management controller of the data processing system so that the management controller can use a shared wireless connection to manage the data processing system using out-of-band communication methods. To securely transmit the wireless connection profiles, a public key of a public-private key pair generated by the management controller may be provided to the hardware resources to send an encrypted copy of the wireless connection profiles to the management controller. Once obtained, the encrypted copy of the wireless connection profiles may be decrypted using a private key of the public-private key pair. The wireless connection profiles may then be stored in a cache hosted by the management controller and used to establish corresponding wireless connections that may be synchronized with the wireless connections established by the hardware resources.

Because the cache may be finite (e.g., a memory of the cache may be limited), the management controller may collect usage metrics for prioritizing the wireless connection profiles stored in the cache. In the event a new wireless connection profile is added to the cache and the cache may is full, a lower prioritized wireless connection profile may be removed from the cache to accommodate the new wireless connection profile.

Because a second data processing system may be provisioned to use a shared wireless connection with the first data processing system, the management controller of the first data processing system may maintain a synchronization status for each wireless connection profile stored in the cache. The synchronization status may be used in identifying when the second data processing system is out of synchronization with the wireless connection profile used by the first data processing system. To enable the second data processing system to use the wireless connection profile, the wireless connection profile may be securely transmitted to the second data processing system from the management controller of the first data processing system via an out-of-band communication channel.

Thus, embodiments disclosed herein may provide an improved method for managing a data processing system by securely sharing wireless connection profiles established by hardware resources of the data processing system. By doing so, a management controller of the data processing system and/or a second data processing system may effectively communicate information to the hardware resources of the first data processing system while using shared wireless connection.

In an embodiment, a method for managing a data processing system for shared wireless connection is provided. The method may include (i) identifying, by a management controller of the data processing system, that a second data processing system is out of synchronization with a wireless connection profile established by hardware resources hosted by the first data processing system, the second data processing system being unable to use the wireless connection profile while out of synchronization; (ii) based on the identifying: (a) securely transmitting, via an out-of-band communication channel, the wireless connection profile to the second data processing system to synchronize the second data processing system so that the second data processing system and the data processing system both utilize a shared wireless connection profile in operation.

Securely transmitting the wireless connection profile may include: (i) obtaining, by the management controller, a public key of a public-private key pair controlled by the second data processing system; and (ii) providing, by the management controller of the first data processing system and via an out-of-band communication channel, an encrypted copy of the wireless connection profile to the second data processing system, the encrypted copy being encrypted using the public key.

The method may also include: prior to identifying that the second data processing system is out of synchronization with the wireless connection profile: (i) establishing, by the hardware resources, wireless connection profiles for use in wireless communications; and (ii) securely synchronizing, by the management controller, a cache with the wireless connection profiles.

The wireless connection profiles may be securely synchronized via a capturing process using an agent hosted by the hardware resources.

The cache may be hosted by the management controller.

The method may also include: (i) obtaining, by the management controller, usage metrics for the wireless connection profiles stored in the cache; and (ii) prioritizing, by the management controller, the wireless connection profiles stored in the cache based on the usage metrics.

The usage metrics may include at least one type of metric selected from a group of types of metrics consisting of: (i) a time of most recent usage; and (ii) a usage count.

The cache may be finite, and the cache may have a cache ejection policy that may be keyed to the prioritizing of the wireless connection profiles so that lower prioritized wireless connection profiles may be preferentially ejected when new wireless connection profiles are obtained and the cache is full.

The data processing system may include hardware resources and a network module adapted to separately advertise network endpoints for the management controller and the hardware resources of the data processing system, the network endpoints being usable by a server system to address communications to the hardware resources using an in-band communication channel and the management controller using an out-of-band communication channel.

The management controller and the network module may be on separate power domains from the hardware resources so that the management controller and the network module are operable while the hardware resources are inoperable.

The out-of-band communication channel may run through the network module, and an in-band communication channel that services the hardware resources may also run through the network module.

The network module may host a transmission control protocol/internet protocol (TCP/IP) stack to facilitate network communications via the out-of-band communication channel.

In an embodiment, a non-transitory media is provided. The non-transitory media may include instructions that when executed by a processor cause the computer-implemented method to be performed.

In an embodiment, a data processing system is provided. The data processing system may include the non-transitory media and a processor, and may perform the computer-implemented method when the computer instructions are executed by the processor.

Turning to FIG. 1A, a distributed environment in accordance with an embodiment is shown. The distributed environment (e.g., the system) shown in FIG. 1A may provide for management of data processing systems that may provide, at least in part, computer-implemented services (e.g., to user of the system and/or devices operably connected to the system).

Figure 1C:
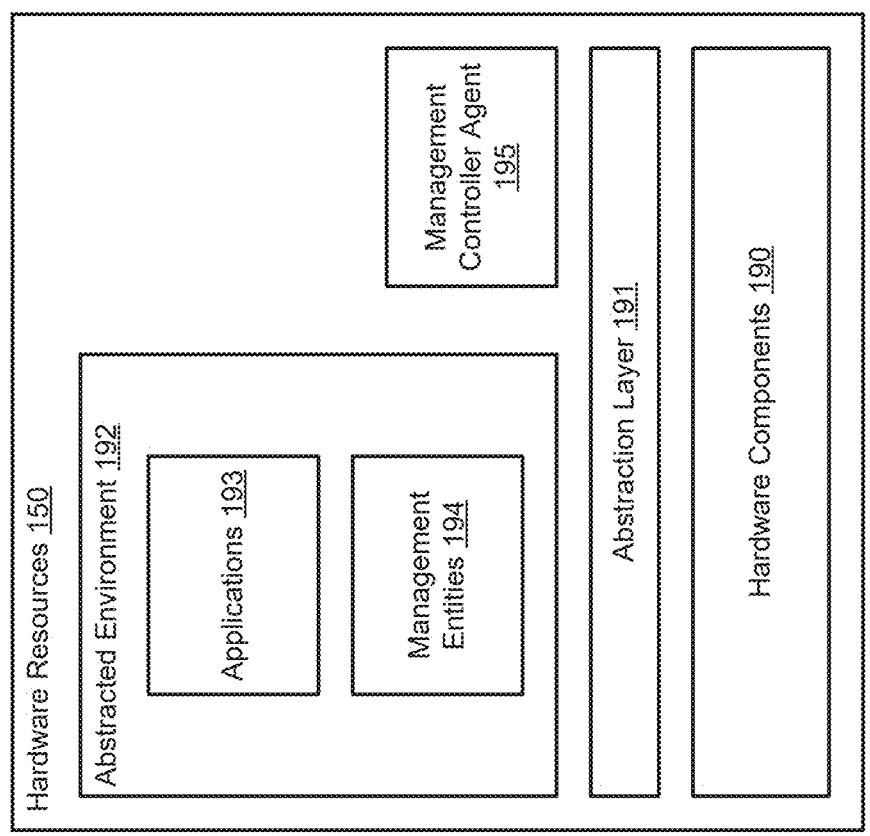

The system may include any number of data processing systems 100 (e.g., computing devices) that may each include any number of hardware components (e.g., processors, memory modules, storage devices, communication devices, etc.). The hardware components may support execution of any number and types of applications (e.g., software components). Changes in available functionalities of the hardware and/or software components may provide for various types of different computer-implemented services to be provided over time. Refer to FIGS. 1B-1C for additional details regarding data processing systems 100.

The computer-implemented services may include any type and quantity of computer-implemented services. The computer-implemented services may include, for example, database services, data processing services, electronic communication services, and/or any other services that may be provided using one or more computing devices. The computer-implemented services may be provided by, for example, data processing systems 100, server system 102, and/or any other type of devices (not shown in FIG. 1A). Other types of computer-implemented services may be provided by the system shown in FIG. 1A without departing from embodiments disclosed herein.

To manage operation of a data processing system (e.g., 100A), data processing system 100A may include a management controller. The management controller may operate independently from the hardware resources of data processing system 100A and may therefore provide management functionalities for data processing system 100A regardless of a status of one or more in-band components (e.g., the hardware resources). To do so, the management controller may obtain information from the hardware resources. In addition, the management controller may receive information from and/or provide information to server system 102 without the information traversing the in-band components.

In the distributed environment, the computer-implemented services may be cooperatively provided by at least the components shown in FIG. 1A. To cooperatively provide the computer-implemented services, the components of FIG. 1A may be wirelessly connected to allow wireless communication between the components. Furthermore, the components may establish any number and/or type of wireless connections at different times. For example, a wireless connection may be established based on a quality and/or availability of a wireless network.

The hardware resources (e.g., an operating system) of data processing system 100A may establish wireless connection profiles to facilitate corresponding connections to wireless networks. For example, a wireless connection profile may include credentials (e.g., username, password, etc.), security settings, session identifiers, and/or any other information.

Because the management controller of data processing system 100A may operate independently (e.g., out-of-band) from the hardware resources of data processing system 100A, the management controller may require a shared wireless connection to communicate sensitive information with the hardware resource.

While providing the computer-implemented services, any number of additional data processing systems in the distributed environment may also be provisioned to have synchronized wireless connection profiles established by the hardware resources of data processing system 100A.

However, other entities (e.g., the management controller of the first data processing system, and/or additional data processing systems) may be unable to establish a shared wireless connection with hardware resources of the first data processing system in a trusted manner. For example, an interface may not be provided for the management controller to configure a desired wireless connection, and/or a distinct wireless connection established by the management controller may limit information communicated to the management controller (e.g., a bifurcation of network endpoints may cause the management controller and the hardware resources to be treated as separate devices and communication of sensitive information necessary to manage data processing system 100A may be restricted). Additionally, a second data processing system may be unable to use a wireless connection profile if out of synchronization with data processing system 100A. Subsequently, computer-implemented services provided by data processing systems 100 may be negatively impacted.

In general, embodiments disclosed herein may provide methods, systems, and/or devices for shared wireless connection between entities in a distributed environment. To improve a seamlessness of establishing trusted wireless connections, wireless connection profiles may be shared by hardware resources of a data processing system. When obtained, the shared wireless connection profiles may be used by other entities (e.g., a management controller of the data processing system and/or other data processing systems) to establish a shared wireless connection (e.g., to a network) for wireless communication. By doing so, a quality and/or availability of computer-implemented services provided by data processing systems 100 may be improved.

Any number and type of wireless connection profiles (e.g., a wireless local-area network profile) may be created and used by hardware resources of a data processing system (e.g., 100A) to establish wireless connections to networks. To facilitate transfer of the wireless connection profiles to out-of-band components (e.g., a management controller of the data processing system), an in-band operating system (OS) agent may capture and transmit the wireless connection profiles from an operating system hosted by the hardware resources to the management controller of data processing system 100A.

Because the wireless connection profiles may include sensitive information (e.g., credentials, passwords, etc.), at least a portion of the wireless connection profiles may be encrypted during transmission to the management controller. To do so, the management controller may generate a public-private key pair and provide the public key of the public-private key pair to the OS agent. The OS agent may use the public key to generate an encrypted copy of the wireless connection profiles that may be sent to the management controller. Once obtained, the encrypted copy of the wireless connection profiles may be decrypted using a private key of the public-private key pair. The wireless connection profiles may then be stored in a cache hosted by the management controller. A wireless connection profile stored in the cache may be used by the management controller to establish a shared wireless connection with the hardware resources. For example, the wireless connection profile may be used by the management controller to establish a wireless connection with the same network (e.g., via service set identifier, credentials, settings, and/or other information included in the wireless connection profile) as used by the hardware resources.

The wireless connection profiles stored in the cache may be updated (e.g., added, removed, and/or changed) based on changes in usage of different wireless networks by the hardware resources. To maintain a synchronization of wireless connection profiles between the hardware resources and the management controller of data processing system 100A, the OS agent may detect the updates (e.g., via a polling method) and submit a request to the management controller. The management controller may update the cache based on the request.

Because the cache may be finite (e.g., a memory of the cache may be limited), the management controller may prioritize the wireless connection profiles stored in the cache so that if a request to add a new wireless profile is provided by the OS agent and the cache is full, a lower prioritized wireless connection profile may be removed from the cache to accommodate the new wireless connection profile. The wireless connection profiles may be prioritized based on usage metrics collected by the management controller. The usage metrics may include, for example, (i) a time of most recent usage of the wireless connection profile, (ii) a usage count of the wireless connection profile, and/or any other information usable to determine a likelihood that the wireless connection profile may be used.

Synchronization of wireless connection profiles may be maintained between a second data processing system (e.g., 100B) (and/or any number of other entities) and data processing system 100A (e.g., an entity that obtained and distributed the wireless connection profile to other entities), by securely transmitting an updated wireless connection profile from the management controller of data processing system 100A when data processing system 100B is identified to be out of synchronization with data processing system 100A. To identify when data processing system 100B is out of synchronization, the management controller of data processing system 100A may utilize a synchronization status of wireless profiles in the cache.

For example, when a wireless profile is added to the cache and has not been transmitted to data processing system 100B, the synchronization status of the wireless connection profile may indicate that data processing system 100B is out of synchronization. To securely transmit the wireless connection profile to data processing system 100B, an encrypted copy of the wireless connection profile may be sent to and decrypted by data processing system 100B (e.g., using a public-private key pair provided by data processing system 100B). When obtained, a wireless connection profile may be used by data processing system 100B to establish a shared wireless connection with hardware resources of data processing system 100A to provide computer-implemented services.

To provide the above noted functionality, the system may include data processing systems 100, and server system 102. Each of these components is discussed below.

Data processing systems 100 may include any number of data processing systems (e.g., 100A-100N) that may individually and/or cooperatively provide at least a portion of the computer-implemented services. Any of data processing systems 100 may include in-band components (e.g., hardware resources), out-of-band components (e.g., management controller, network modules, etc.), and functionality that may allow the out-of-band components to communicate with server system 102 via an out-of-band communication channel.

To enable wireless communication, a data processing system (e.g., 100A) of data processing systems 100 may create and store wireless connection profiles for use in establishing wireless connections to a network. Other entities (e.g., a management controller of data processing system 100A, and/or other data processing systems of data processing systems 100) may cooperatively provide computer-implemented services using a shared wireless connection to the wireless connection established by the hardware resources of data processing system 100A. To do so, the wireless connection profiles established by the hardware resources of data processing system 100A may be securely transmitted (e.g., using a public-private key pair encryption) to the other entities. Data processing systems 100 may maintain a synchronization of the wireless connection profiles to reduce likelihood of interruptions in the computer-implemented services.

Server system 102 may, as discussed above, provide remote management services. To provide remote management services, server system 102 may interact with data processing systems 100 to provide instructions regarding operation of data processing systems 100 and/or updates to the computer-implemented services provided by data processing systems 100. For example, server system 102 may send instructions relevant to management of any number of data processing systems in data processing systems 100 across an out-of-band communication channel. To receive the remote management services provided by server system 102, each data processing system of data processing systems 100 may require a shared wireless connection with each other and/or with server system 102. To securely establish a shared wireless connection, wireless connection profiles may be synchronized between data processing systems in data processing system 100 and/or server system 102.

While providing their functionality, any of data processing systems 100 and/or server system 102 may provide all or a portion of the methods shown in FIGS. 2A-3B.

Communication system 104 may allow any of data processing systems 100, and server system 102 to communicate with one another (and/or with other devices not illustrated in FIG. 1A). To provide its functionality, communication system 104 may be implemented with one or more wired and/or wireless networks. Any of these networks may be a private network (e.g., the "Network" shown in FIG. 4), a public network, and/or may include the Internet. For example, data processing systems 100 may be operably connected to server systems 102 via the Internet. Data processing systems 100, server system 102, and/or communication system 104 may be adapted to perform one or more protocols for communicating via communication system 104.

Any of (and/or components thereof) data processing systems 100, and server system 102 may be implemented using a computing device (also referred to as a data processing system) such as a host or a server, a personal computer (e.g., desktops, laptops, and tablets), a "thin" client, a personal digital assistant (PDA), a Web enabled appliance, a mobile phone (e.g., Smartphone), an embedded system, local controllers, an edge node, and/or any other type of data processing device or system. For additional details regarding computing devices, refer to FIG. 4.

Thus, as shown in FIG. 1A, a system in accordance with an embodiment may manage data processing systems 100 by synchronizing wireless connection profiles between entities (e.g., a management controller, and/or different data processing systems) that may require a shared wireless connection for operation. By doing so, interruptions to computer-implemented services caused by incompatible wireless connections may be reduced.

While illustrated in FIG. 1A with a limited number of specific components, a system may include additional, fewer, and/or different components without departing from embodiments disclosed herein.

Turning to FIG. 1B, a diagram illustrating a data processing system in accordance with an embodiment is shown. Data processing system 100A shown in FIG. 1B may be similar to any of the data processing systems shown in FIG. 1A.

To provide computer-implemented services, data processing system 100A may include any quantity of hardware resources 150. Hardware resources 150 may be in-band hardware components, and may include a processor operably coupled to memory, storage, and/or other hardware components.

The processor may host various management entities such as operating systems, drivers, network stacks, and/or other software entities that provide various management functionalities. For example, the operating system and drivers may provide abstracted access to various hardware resources.

To facilitate communication, hardware resources 150 may host a network stack that may facilitate packaging, transmission, routing, and/or other functions with respect to exchanging data with other devices. For example, the network stack may support transmission control protocol/internet protocol communication (TCP/IP) (e.g., the Internet protocol suite) thereby allowing hardware resources 150 to communicate with other devices via packet switched networks and/or other types of communication networks.

Hardware resources 150 may wirelessly communicate with other entities by connecting to a wireless network. Furthermore, connections may be established with different wireless networks at different times (e.g., based on a quality and/or availability of a wireless network). To manage the different wireless connections, hardware resources 150 may create and store different wireless connection profiles (e.g., a WiFi profile, a wireless local-area network profile, etc.). A wireless connection profile may be used to request and establish a connection to a wireless communication network.

The processor may also host various applications that provide the computer-implemented services. The applications may utilize various services provided by the management entities and use (at least indirectly) the network stack to communication with other entities.

However, if the network stack is unable to communicate with the other entities due to an unavailability and/or an incompatibility of a wireless network used by the other entities, applications hosted by hardware resources 150 may be unable to provide the computer-implemented services. For example, a user of data processing system 100A may be unable to obtain desired services and/or a quality of user experience may be diminished when applications are unable to wirelessly communicate with other entities.

To improve a likelihood that the applications may be able to wirelessly communicate with other entities without interruption, wireless connections established by hardware resources 150 may be shared with the other entities. To manage the sharing of wireless connections, data processing system 100A may include management controller 152 and network module 160. Each of these components of data processing system 100A is discussed below.

Management controller 152 may be implemented, for example, using a system on a chip or other type of independently operating computing device (e.g., independent from the in-band components, such as hardware resources 150, of a host data processing system 100A). Management controller 152 may provide various management functionalities for data processing system 100A. For example, management controller 152 may monitor various ongoing processes performed by the in-band component, may manage power distribution, thermal management, and/or other functions of data processing system 100A.

To do so, management controller 152 may be operably connected to various components via sideband channels 174 (in FIG. 1B, a limited number of sideband channels are included for illustrative purposes, it will be appreciated that management controller 152 may communication with other components via any number of sideband channels). The sideband channels may be implemented using separate physical channels, and/or with a logical channel overlay over existing physical channels (e.g., logical division of in-band channels). The sideband channels may allow management controller 152 to interface with other components and implement various management functionalities such as, for example, general data retrieval (e.g., to snoop ongoing processes), telemetry data retrieval (e.g., to identify a health condition/other state of another component), function activation (e.g., sending instructions that cause the receiving component to perform various actions such as displaying data, adding data to memory, causing various processes to be performed), and/or other types of management functionalities.

For example, to enable sensitive information from hardware resources to be communicated to management controller 152, management controller 152 may utilize a shared wireless connection. To do so, management controller may capture wireless connection profiles established by hardware resources 150. Because information (e.g., the wireless connection profiles) stored on hardware resources 150 may not be directly accessible to management controller 152, a software agent (e.g., an operating system agent) hosted in hardware resources 150 may facilitate the capture and transmission of the wireless connection profiles stored in hardware resources 150. Refer to FIG. 1C for additional details regarding the operating system agent.

Management controller 152 may be operably connected to communication components of data processing system 100A via separate channels (e.g., 172) from the in-band components, and may implement or otherwise utilize a distinct and independent network stack (e.g., TCP/IP). Consequently, management controller 152 may communicate with other devices independently of any of the in-band components (e.g., does not rely on any hosted software, hardware components, etc.). Accordingly, compromise of any of hardware resources 150 and hosted component may not result in indirect compromise of any management controller 152, and entities hosted by management controller 152.

To facilitate communication with other devices, data processing system 100A may include network module 160. Network module 160 may provide communication services for in-band components and out-of-band components (e.g., management controller 152) of data processing system. To do so, network module 160 may include traffic manager 162 and interfaces 164.

Traffic manager 162 may include functionality to (i) discriminate traffic directed to various network endpoints advertised by data processing system 100A, and (ii) forward the traffic to/from the entities associated with the different network endpoints. For example, to facilitate communications with other devices, network module 160 may advertise different network endpoints (e.g., different media access control address/internet protocol addresses) for the in-band components and out-of-band components. Thus, other entities may address communications to these different network endpoints. When such communications are received by network module 160, traffic manager 162 may discriminate and direct the communications accordingly (e.g., over channel 170 or channel 172, in the example shown in FIG. 1B, it will be appreciated that network module 160 may discriminate traffic directed to any number of data units and direct it accordingly over any number of channels).

Accordingly, traffic directed to management controller 152 may never flow through any of the in-band components. Likewise, outbound traffic from the out-of-band component may never flow through the in-band components.

To support inbound and outbound traffic, network module 160 may include any number of interfaces 164. Interfaces 164 may be implemented using any number and type of communication devices which may each provide wired and/or wireless communication functionality. For example, interfaces 164 may include a wide area network card, a WiFi card, a wireless local area network card, a wired local area network card, an optical communication card, and/or other types of communication components. These components may support any number of wired/wireless channels 176.

Thus, from the perspective of an external device, the in-band components and out-of-band components of data processing system 100A may appear to be two independent network entities, that may independently addressable, and otherwise unrelated to one another.

To provide its functionality, management controller 152 may rely on information received from other devices via wireless communication over an out-of-band communication channel (e.g., 172). However, the information may include sensitive information regarding hardware resources 150 and may be restricted from being transmitted to management controller 152 if management controller 152 and hardware resources are treated as separate devices based on the separate network endpoints. Restriction of information may disrupt functionalities provided by management controller 152.

To improve a quality of management services provided by management controller 152, wireless connection profiles established by hardware resources 150 may be securely transmitted to management controller 152 for use in sharing wireless connections. The wireless connection profiles may be securely obtained by management controller 152 by: (i) providing a public key of a public-private key pair generated by management controller 152, (ii) obtaining an encrypted copy of the wireless connection profiles from hardware resources 150, (iii) decrypting the encrypted copy of the wireless connection profiles using a private key of the public-private key pair, (iv) storing the wireless connection profiles in a cache hosted by management controller 152, and/or any other processes. A wireless profile stored in the cache may be used to establish a shared wireless connection with hardware resources 150.

Management controller 152 may maintain the cache by prioritizing wireless connection profiles based on a level of usage. The level of usage may be determined based on usage metrics collected by management controller 152 for each wireless connection profile stored in the cache. Furthermore, management controller may obtain a synchronization status for each wireless connection profile that may indicate whether the wireless connection profile has been securely transmitted to another device which may also require a shared wireless connection with hardware resources 150.

To facilitate management of data processing system 100A over time, hardware resources 150, management controller 152 and/or network module 160 may be positioned in separately controllable power domains. By being positioned in these separately controllable power domains, different subsets of these components may remain powered while other subsets are unpowered.

For example, management controller 152 and network module 160 may remain powered while hardware resources 150 is unpowered. Consequently, management controller 152 may remain able to communication with other devices even while hardware resources 150 are inactive. Similarly, management controller 152 may perform various actions while hardware resources 150 are not powered and/or are otherwise inoperable, unable to cooperatively perform various process, are compromised, and/or are unavailable for other reasons.

To implement the separate power domains, data processing system 100A may include a power source (e.g., 180) that separately supplies power to power rails (e.g., 184, 186) that power the respective power domains. Power from the power source (e.g., a power supply, battery, etc.) may be selectively provided to the separate power rails to selectively power the different power domains. A power manager (e.g., 182) may manage power from power source 180 that is supplied to the power rails. Management controller 152 may cooperate with power manager 182 to manage supply of power to these power domains.

In FIG. 1B, an example implementation of separate power domains using power rails 184-186 is shown. The power rails may be implemented using, for example, bus bars or other types of transmission elements capable of distributing electrical power. While not shown, it will be appreciated that the power domains may include various power management components (e.g., fuses, switches, etc.) to facilitate selective distribution of power within the power domains.

When providing its functionality, management controller 152 may perform all, or a portion, of the methods and operations illustrated in FIGS. 2A-3B.

While illustrated in FIG. 1B with a limited number of specific components, a system may include additional, fewer, and/or different components without departing from embodiments disclosed herein.

Turning to FIG. 1C, to provide computer-implemented services, hardware resources 150 may host applications 193 and management entities 194. Management entities 194 may include, for example, drivers, operating systems, and/or other entities that facilitate operation of applications 193 by facilitating use of hardware components 190. Hardware components 190 may include processors, memory modules, storage devices, and/or other types of hardware components usable to provide computer-implemented services.

Applications 193 may provide any quantity and type of computer-implemented services using hardware components 190. When operating, applications 193 may use abstracted access to the functionality of hardware components 190 provided by management entities 194. For example, the applications may make calls to an operating system which in turn makes calls to drivers which in turn communicate with the hardware components to invoke their various functionalities.

In an embodiment, hardware resources 150 also hosts abstraction layer 191. Abstraction layer 191 may include software such as hypervisors, dockers, and/or other entities that provide abstracted access to hardware components to various abstracted environments (e.g., 192). The abstracted environments may include virtual machines, containers, etc. Through abstraction layer 191 and abstracted environments, hardware resources 150 may host various instances of management entities and applications that may utilize the functionalities of hardware components 190.

To facilitate cooperation between management controller 152 and hardware resources 150, hardware resources 150 may host management controller agent 195. Management controller agent 195 may be independent from the abstracted environments, and may facilitate communication with and performance of instructions by management controller 152.

For example, management controller agent 195 may include functionality to (i) enumerate current wireless connection profiles established by hardware resources 150, (ii) capture supported wireless connection profiles to transmit to management controller 152, (iii) request an encryption key to send an encrypted copy of the identified wireless connection profiles, (iv) detect updates to existing wireless connection profiles used by hardware resources 150, (v) transmit requests to update wireless connection profiles, and/or any other actions.

While illustrated in FIG. 1C with a limited number of specific components, a system may include additional, fewer, and/or different components without departing from embodiments disclosed herein.

Thus, as shown in FIG. 1C, a management controller agent (e.g., an operating system agent) may facilitate cooperation between management controller 152 and hardware resources 150 to maintain synchronized wireless connection profiles.

Figure 2A:
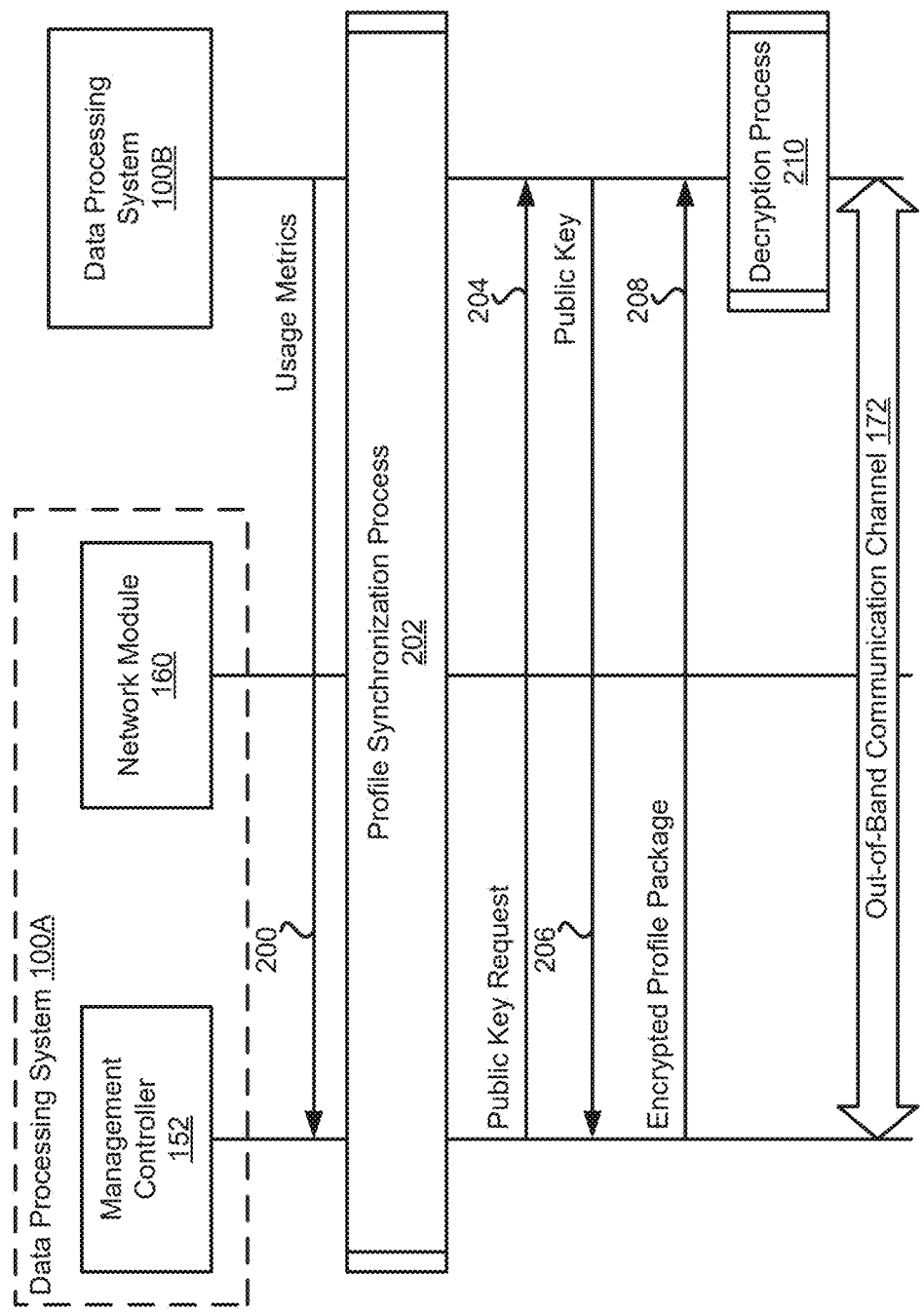
FIGS. 2A-2C show interaction diagrams in accordance with an embodiment.
Figure 2B:
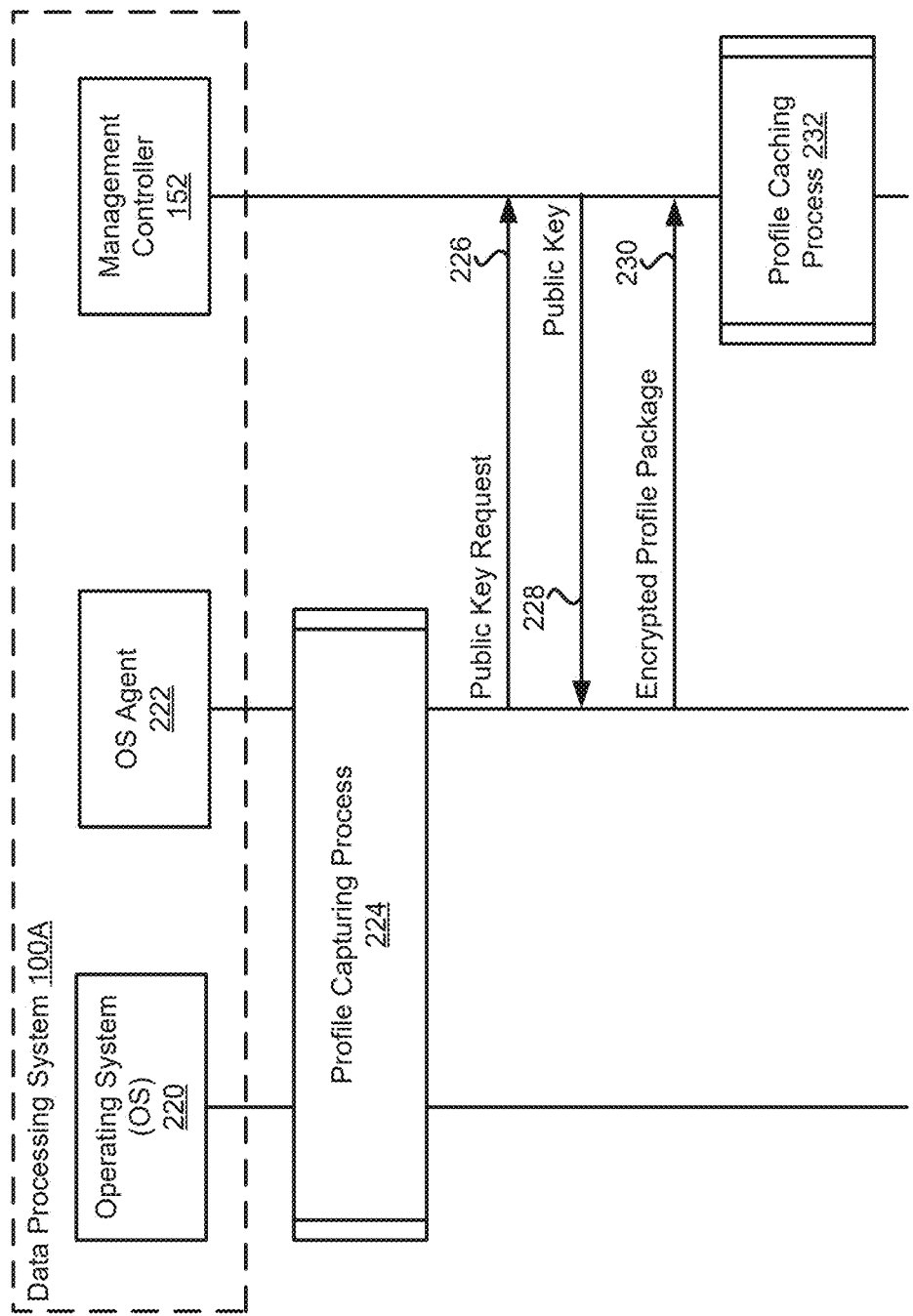
Figure 2C:
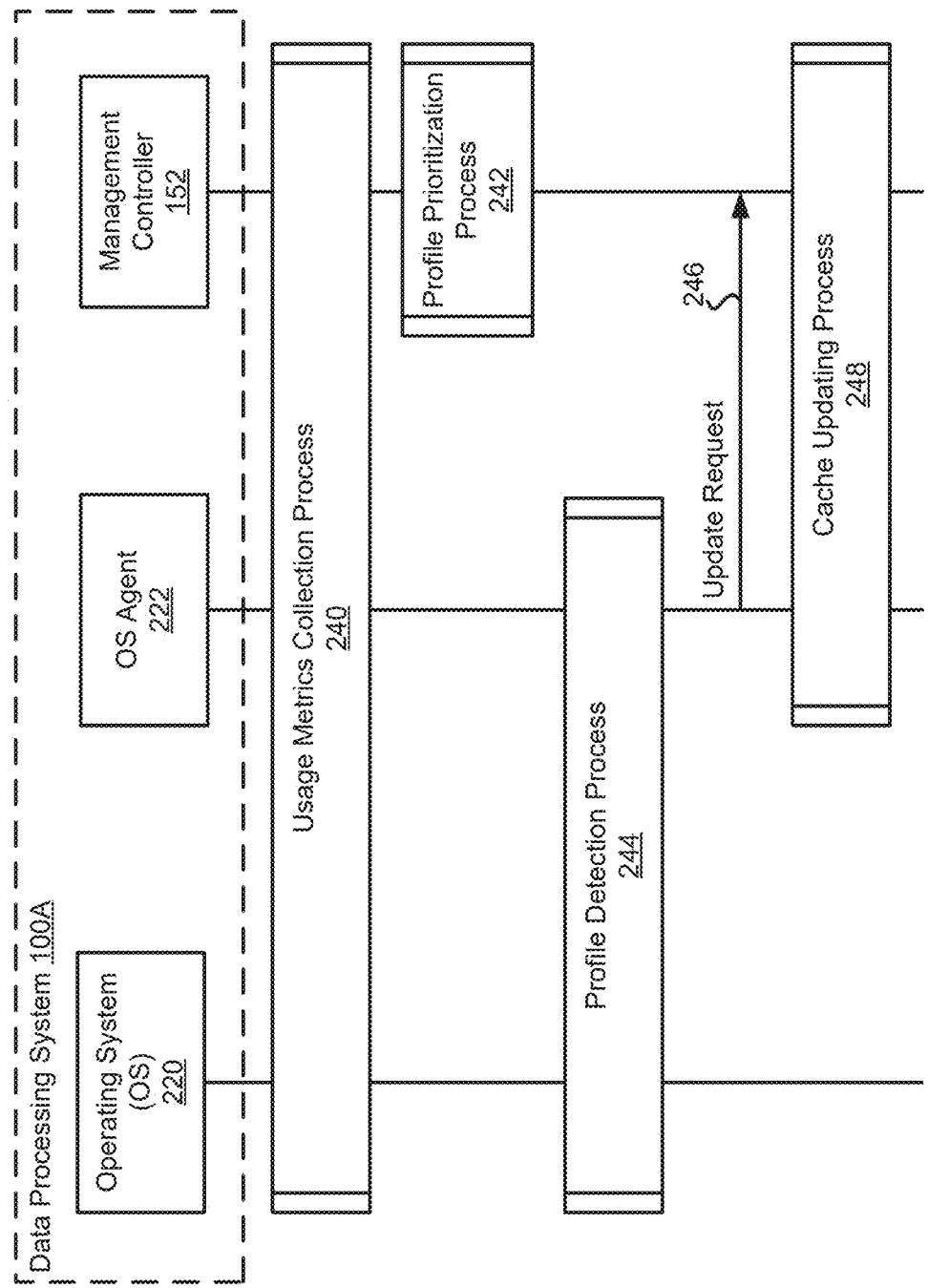

To further clarify embodiments disclosed herein, an interaction diagram in accordance with an embodiment is shown in FIGS. 2A-2C. The interaction diagram may illustrate how data may be obtained and used within the system of FIGS. 1A-1C.

In the interaction diagrams, processes performed by and interactions between components of a system in accordance with an embodiment are shown. In the diagrams, components of the system are illustrated using a first set of shapes (e.g., 152, 160, etc.), located towards the top of each figure. Lines descend from these shapes. Processes performed by the components of the system are illustrated using a second set of shapes (e.g., 202, 210, etc.) superimposed over these lines. Interactions (e.g., communication, data transmissions, etc.) between the components of the system are illustrated using a third set of shapes (e.g., 200, 204, etc.) that extend between the lines. The third set of shapes may include lines terminating in one or two arrows. Lines terminating in a single arrow may indicate that one way interactions (e.g., data transmission from a first component to a second component) occur, while lines terminating in two arrows may indicate that multi-way interactions (e.g., data transmission between two components) occur.

Generally, the processes and interactions are temporally ordered in an example order, with time increasing from the top to the bottom of each page. For example, the interaction labeled as 200 may occur prior to the interaction labeled as 204. However, it will be appreciated that the processes and interactions may be performed in different orders, any may be omitted, and other processes or interactions may be performed without departing from embodiments disclosed herein.

Turning to FIG. 2A, a first interaction diagram in accordance with an embodiment is shown. The first interaction diagram may illustrate processes and interactions that may occur during synchronization of wireless connection profiles between data processing systems.

Data processing system 100B may be a second data processing system of data processing systems 100. Data processing system 100B may be provisioned to have synchronized wireless connection profiles with data processing system 100A, and may use the wireless connection profiles to establish a shared wireless connection with data processing system 100A in order to provide computer-implemented services. While not shown, it may be appreciated that any interactions and/or processes performed by data processing system 100B may be performed by any component of data processing system 100B. For example, data transmitted from and/or received by data processing system 100B may be provided and/or obtained by: (i) hardware resources, (ii) a network module, (iii) a management controller, and/or any other components of data processing system 100B.

In FIG. 2A, network module 160 is shown to indicate that any interactions that may occur between a management controller 152 and data processing system 100B may be facilitated by network module 160. For example, data provided by management controller 152 to send to data processing system 100B may: (i) be sent from management controller 152 to network module 160, (ii) packaged with control information, and (iii) sent to a component (e.g., a network module) of data processing system 100B.

At interaction 200, usage metrics may be provided to management controller 152 of data processing system 100A by data processing system 100B. The usage metrics may indicate a level of usage for an existing wireless network profile, and may include: (i) a time of most recent use of the wireless connection profile, (ii) a usage count for the wireless connection profile, and/or any other metrics. To generate and provide the usage metrics to management controller 152, data processing system 100B may (i) collect data regarding usage of each wireless connection profile over a period of time, (ii) transmit the usage metrics via a message, (iii) store the usage metrics in a storage with subsequent retrieval by management controller 152, (iv) participate in a publish-subscribe system where management controller 152 subscribes to updates from data processing system 100B thereby causing a copy of the usage metrics to be propagated to management controller 152, and/or via other processes. The usage metrics may be requested and used by management controller 152 for purposes of prioritizing wireless connection profiles in a cache hosted by management controller 152. Refer to FIG. 2C for additional details regarding prioritization of wireless connection profiles.

To identify if data processing system 100B may be out of synchronization with a wireless connection profile established by data processing system 100A, profile synchronization process 202 may be performed. During profile synchronization process 202, a state of synchronization of a wireless connection profile may be obtained. For example, to obtain the state of synchronization, management controller 152 may: (i) maintain an event log of updates and/or transmissions of each wireless network profile, (ii) perform a comparison between a version of a wireless connection profile stored in the cache and a version of the wireless connection profile used by data processing system 100B (if the wireless connection profile exists), and/or any other perform any other actions. If data processing system 100B is determined to be out of synchronization with the wireless connection profile established by data processing system 100A, management controller 152 may securely transmit the wireless connection profile to synchronize data processing system 100B.

At interaction 204, a public key request may be provided to data processing system 100B by management controller 152. For example, the public key request may be generated and provided to data processing system 100B via (i) transmission of message indicating a request to transfer encrypted data, (ii) a notification system where data processing system 100B receives notifications of requests provided by data processing system 100A, and/or any other processes. By providing the public key request to data processing system 100B, data processing system 100B may provide encryption methods for secure transmission of data.

At interaction 206, a public key may be provided to management controller 152 by data processing system 100B. For example, the public key may be generated and provided to management controller 152 by: (i) generating a public-private key pair, (ii) transmitting the public key of the public-private key pair via message or file transfer, and/or any other process. By providing the public key to management controller 152, management controller 152 may provide an encrypted copy of the wireless connection profile.

At interaction 208, an encrypted profile package may be provided to data processing system 100B by management controller 152. For example, the encrypted profile package may be generated and provided to data processing system 100B via (i) encryption of the wireless connection profile using the public key, (ii) transmission via a message, (iii) storing in a storage with subsequent retrieval by data processing system 100B, and/or any other process. By providing the encrypted profile package to data processing system 100B, data processing system 100B may securely receive the wireless connection profile and the state of synchronization may be updated.

To obtain the contents of the encrypted profile package, decryption process 210 may be performed. During decryption process 210, the encrypted profile package may be decrypted, and the wireless connection profile may be stored for use. To decrypt the encrypted profile package, data processing system 100B may (i) obtain a private key of the public-private key pair, (ii) perform decryption using the private key (e.g., by issuing a command using the private key and the encrypted profile package), and/or any other process to access the wireless connection profile. Once obtained, the wireless connection profile may be stored in and used by a component of data processing system 100B. For example, the wireless connection profile may be stored in hardware resources and/or a management controller of data processing system 100B. The result of decryption process 210 may be a synchronization of wireless connection profiles between data processing system 100A and data processing system 100B, where data processing system 100A and data processing system 100B may both utilize a shared wireless connection profile in operation.

Out-of-band communication channel 172A may be used to facilitate communication between management controller 152, network module 160, and/or data processing system 100B, and is shown to indicate that the communication directed between management controller 152 and data processing system 100B may not flow through any of the in-band components (e.g., hardware resources of data processing system 100A).

Thus, processes and interactions shown in FIG. 2A, a second data processing system may obtain and be synchronized with wireless connection profiles established by a first data processing system. By doing so, a quality and/or availability of computer-implemented services (e.g., user experience) provided by both data processing systems may be improved.

Turning to FIG. 2B, a second interaction diagram in accordance with an embodiment is shown. The second interaction diagram may illustrate processes and interactions that may occur during synchronization of wireless connection profiles between hardware resources and a management controller of a data processing system.

Operating system 220 may be an operating system hosted by hardware resources of data processing system 100A. Operating system 220 may provide management services for hardware and/or software resources of data processing system 100A. To do so, operating system 220 may establish any number and/or type of wireless connections to networks at different times (e.g., based on a quality and/or availability of the networks). To manage the wireless connections, operating system 220 may create wireless connection profiles to facilitate establishing wireless connections, for example, with configurations and credentials necessary to establish the wireless connection.

Operating system agent 222 may facilitate cooperation between operating system 220 and management controller 152 (e.g., similar to management controller agent 195). Because hardware resources of data processing system 100A may operate independently from management controller 152 of data processing system 100A and operating system 220 may be hosted by the hardware resources, information (e.g., the wireless connection profiles, and/or any other data) may be abstracted from management controller 152. Therefore, operating system agent 222 may facilitate communication between operating system 220 and management controller 152.

To obtain wireless connection profiles from operating system 220, profile capturing process 224 may be performed. During profile capturing process 224, supported wireless connection profiles stored on operating system 220 may be identified to be transmitted. To identify supported wireless connection profiles, operating system agent 222 may (i) enumerate the wireless connection profiles stored on operating system 220, (ii) perform an application programming interface (API) function to retrieve information regarding each of the wireless connection profiles, (iii) identify the wireless connection profiles that may be supported by management controller 152 (e.g., by filtering results of the retrieved information to exclude wireless connection profiles which may be incompatible and/or may require additional input from management controller 152), and/or any other processes. The result of profile capturing process 224 may be any number and/or type of wireless connection profiles to be transmitted to management controller 152.

At interaction 226, a public key request may be provided to management controller 152 by operating system agent 222. For example, the public key request may be generated and provided to management controller 152 over an out-of-band communication channel via (i) transmission of message indicating a request to transfer encrypted data, (ii) a notification system where management controller 152 receives notifications of requests provided by data processing system 100A, and/or any other processes. By providing the public key request to management controller 152, management controller 152 may provide encryption methods for secure transmission of data.

At interaction 228, a public key may be provided to operating system agent 222 by management controller 152. For example, the public key may be generated and provided to operating system agent 222 by: (i) generating a public-private key pair, (ii) transmitting the public key of the public-private key pair via message or file transfer, and/or any other process. By providing the public key to operating system agent 222, operating system agent 222 may provide an encrypted copy of the wireless connection profiles.

At interaction 230, an encrypted profile package may be provided to management controller 152 by operating system agent 222. For example, the encrypted profile package may be generated and provided to management controller 152 via (i) encryption of the wireless connection profiles using the public key, (ii) transmission of an encrypted copy of the wireless connection profiles via a message, (iii) storing in a storage with subsequent retrieval by data processing system 100B, and/or any other process. By providing the encrypted profile package to management controller 152, management controller 152 may securely receive the wireless connection profiles.

To add the wireless connection profiles to a cache hosted by management controller 152, profile caching process 232 may be performed. During profile caching process 232, the encrypted profile package may be decrypted to obtain the wireless connection profiles, and the wireless connection profiles may be added to a cache hosted by management controller 152. To decrypt the encrypted profile package, management controller 152 may (i) obtain a private key of the public-private key pair, (ii) perform decryption using the private key (e.g., by issuing a command using the private key and the encrypted profile package), and/or any other process to access the wireless connection profiles. To store the obtained wireless connection profiles to the cache, (i) the cache may be provisioned (e.g., created based on configuration settings, memory capacity may be assessed, cleared, etc.), (ii) a data repository may be created, (iii) the wireless connection profiles may be written into the cache, and/or any other processes. By storing the wireless connection profiles in the cache, management controller 152 may be able to use a wireless connection profile to establish a shared wireless connection with hardware resources of data processing system 100A.

Thus, processes and interactions shown in FIG. 2B, a cache hosted by a management controller of a data processing system may be created and synchronized to wireless connection profiles established by hardware resources of the data processing system. By doing so, a quality of management services provided by the management controller may be improved.

Turning to FIG. 2C, a third interaction diagram in accordance with an embodiment is shown. The third interaction diagram may illustrate processes and interactions that may occur during updating of wireless connection profiles between hardware resources and a management controller of a data processing system.

To obtain a level of usage for each wireless connection profile, usage metrics collection process 240 may be performed. During usage metrics collection process 240, usage metrics may be collected for each wireless connection profile stored in a cache hosted by management controller 152. To collect the usage metrics, (i) activity of each wireless profile may be monitored (e.g., when used to establish a wireless connection), (ii) an event log may be maintained and updated in a data repository in the cache, (iii) requests may be sent to operating system 220 to obtain usage metrics collected by operating system 220, and/or any other methods. For example, the usage metrics may include a time (e.g., a datetime object) of most recent usage (e.g., used to establish a wireless connection by operating system 220 and/or management controller 152), a usage count, and/or any other metrics usable to identify a level of usage of a wireless connection profile. The usage metrics collected in usage metrics collection process may be used to order wireless connection profiles in profile prioritization process 242.

To reduce an impact of an ejected wireless connection profile when a cache ejection policy is executed, profile prioritization process 242 may be performed. During profile prioritization process 242, the wireless connection profiles stored in the cache may be ordered. To order the wireless connection profiles, (i) usage metrics of each wireless connection profile may be compared to each other, (ii) a level of usage of each wireless connection profile may be determined (e.g., a wireless connection profile with a more recent usage may indicate a higher level of usage than a wireless connection profile with a less recent usage, a wireless connection profile with a higher usage count may indicate a higher level of usage than a wireless connection profile with a lower usage count, etc.), (iii) a future use of a wireless connection profile may be inferred (e.g., based on a function of the usage metrics), and/or any other methods.

To identify updates to wireless connection profiles used by operating system 220, profile detection process 224 may be performed. During profile detection process 224, updates to wireless connection profiles used by operating system 220 may be identified. To identify updates to wireless connection profiles used by operating system 220, (i) a state of a data repository for storage of wireless connection profiles established by operation system 220 may be monitored for changes (e.g., via a polling process), (ii) a request may be provided to operating system 220 by operating system agent 222 to transmit information regarding changes to wireless connection profiles (e.g., added, removed, and/or edited wireless connection profiles), and/or any other processes.

At interaction 246, an update request may be provided to management controller 152 by operating system agent 222. For example, the update request may be generated and provided to management controller 152 via (i) transmission of message indicating a request to transfer encrypted data, (ii) a publish-subscribe system where management controller 152 subscribes to updates from operating system agent 222 thereby causing a copy of the update request to be propagated to management controller 152, and/or any other processes. The update request may include instructions to add, remove, and/or update contents of a wireless connection profile stored in the cache.

To update wireless connection profiles stored in the cache, cache updating process 248 may be performed. During cache updating process 248, a new wireless connection profile may be securely transmitted by the operating system agent, an existing wireless connection profile may be removed from the cache, and/or an existing wireless connection profile may be updated. To securely transmit a new wireless connection profile, an encrypted copy of the new wireless connection profile may be generated and provided to management controller 152 (e.g., via an encryption process using a public-private key pair similar to interactions 226-230). Because the cache is finite (e.g., limited memory capacity), if a new wireless connection profile is attempting to be added to the cache and the cache is full, a cache ejection policy may be implemented to allow the new wireless connection profile to be added to the cache. For example, the cache ejection policy may utilize a priority of the wireless connection profiles determined during profile prioritization process 242 to eject a lower prioritized wireless connection profile when the cache is full.

To remove an existing wireless connection profile from the cache, management controller 152 may: (i) obtain an identifier of the wireless connection profile (e.g., a profile identifier, a service set identifier (SSID), etc.) to be removed based on the update request, (ii) search a data repository hosted by the cache for the wireless connection profile using the identifier as a key, (iii) perform a command to delete the wireless connection profile from the data repository, and/or any other processes. To update an existing wireless connection profile from the cache, management controller 152 may: (i) perform a command to edit at least a portion of the contents of the wireless connection profile (e.g., change a password, settings, etc.), (ii) remove the existing wireless connection profile from the cache and replace the updated version of the wireless connection profile, and/or any other methods.

Thus, processes and interactions shown in FIG. 2C, a cache hosted by a management controller of a data processing system may be updated when changes to wireless connection profiles established by hardware resources of the data processing system may occur. By doing so, services provided by the data processing system and the management controller may be performed without interruption while using a shared wireless connection.

Any of the processes illustrated using the second set of shapes and interactions illustrated using the third set of shapes may be performed, in part or whole, by digital processors (e.g., central processors, processor cores, etc.) that execute corresponding instructions (e.g., computer code/software). Execution of the instructions may cause the digital processors to initiate performance of the processes. Any portions of the processes may be performed by the digital processors and/or other devices. For example, executing the instructions may cause the digital processors to perform actions that directly contribute to performance of the processes, and/or indirectly contribute to performance of the processes by causing (e.g., initiating) other hardware components to perform actions that directly contribute to the performance of the processes.

Any of the processes illustrated using the second set of shapes and interactions illustrated using the third set of shapes may be performed, in part or whole, by special purpose hardware components such as digital signal processors, application specific integrated circuits, programmable gate arrays, graphics processing units, data processing units, and/or other types of hardware components. These special purpose hardware components may include circuitry and/or semiconductor devices adapted to perform the processes. For example, any of the special purpose hardware components may be implemented using complementary metal-oxide semiconductor based devices (e.g., computer chips).

Any of the processes and interactions may be implemented using any type and number of data structures. The data structures may be implemented using, for example, tables, lists, linked lists, unstructured data, data bases, and/or other types of data structures. Additionally, while described as including particular information, it will be appreciated that any of the data structures may include additional, less, and/or different information from that described above. The informational content of any of the data structures may be divided across any number of data structures, may be integrated with other types of information, and/or may be stored in any location.

Figure 3A:
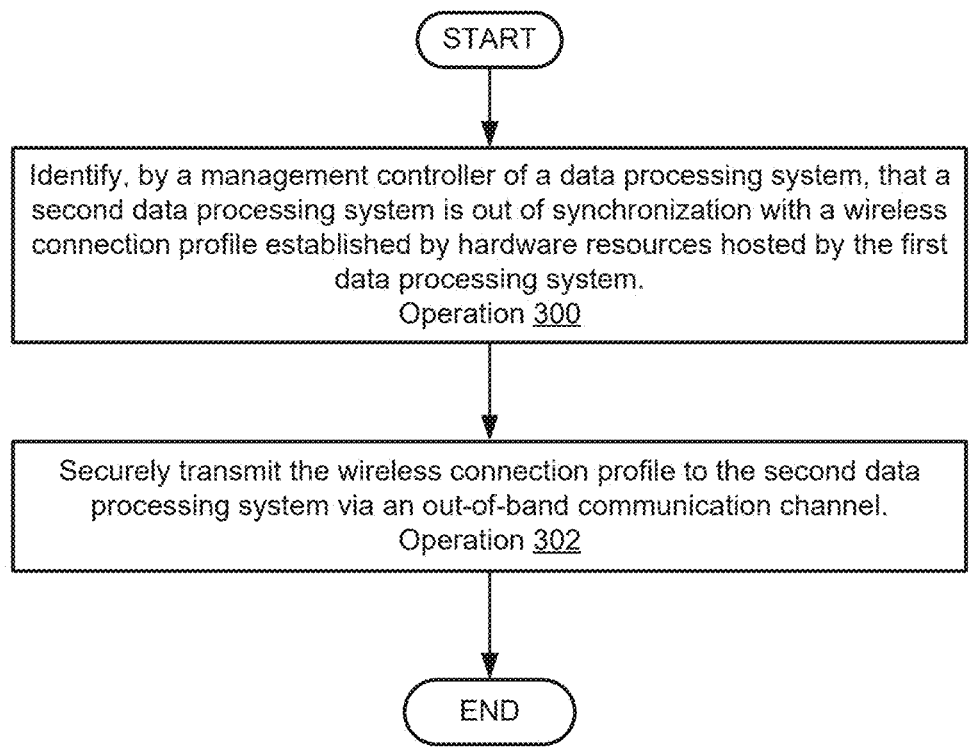
FIGS. 3A-3B show flow diagrams illustrating methods in accordance with an embodiment.
Figure 3B:
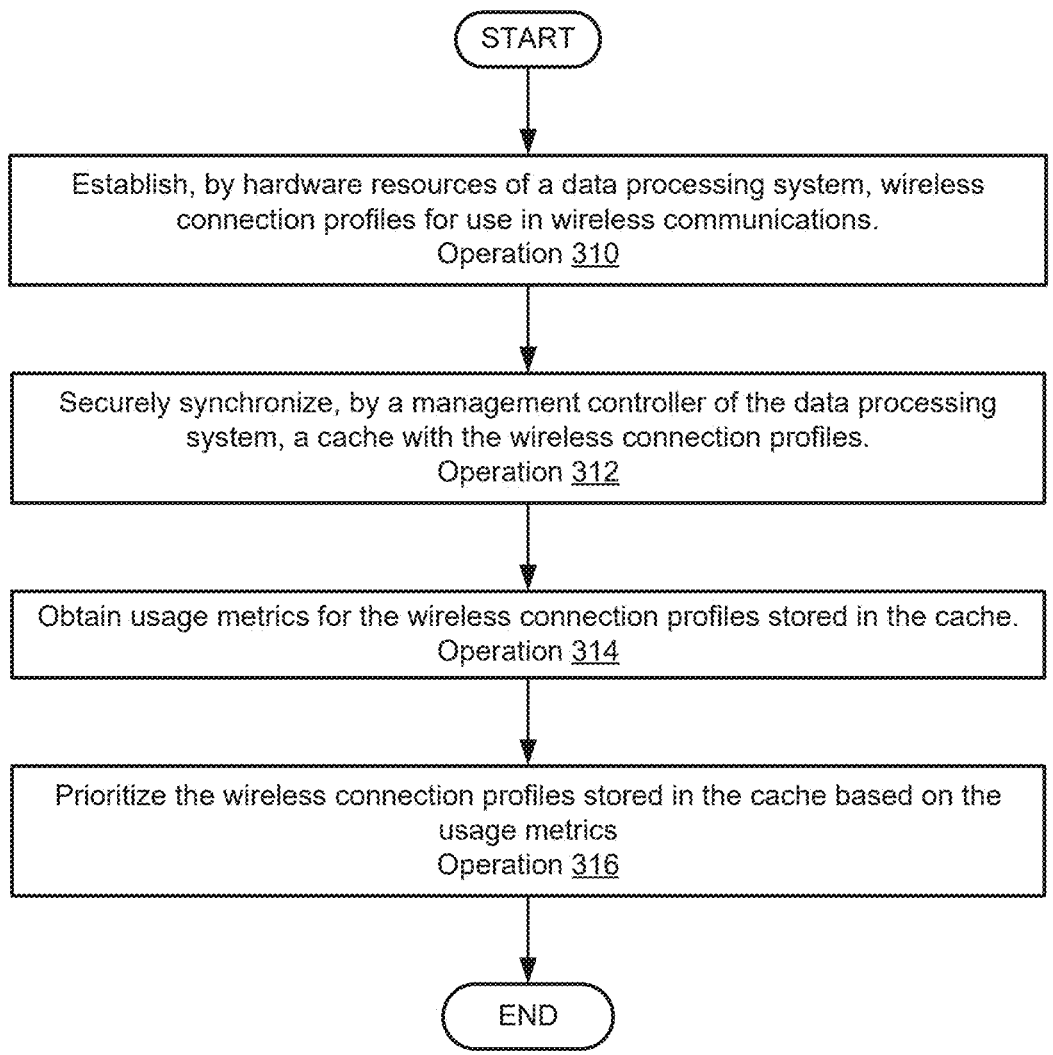

As discussed above, the components of FIG. 1A may perform various methods to manage a data processing system. FIGS. 3A-3B illustrate methods that may be performed by the components of the system of FIGS. 1A-1C. In the diagrams discussed below and shown in FIGS. 3A-3B, any of the operations may be repeated, performed in different orders, and/or performed in parallel with or in a partially overlapping in time manner with other operations.

Turning to FIG. 3A, a first flow diagram illustrating a method of managing a data processing system for shared wireless connection operation in accordance with an embodiment is shown. The method may be performed, for example, by any of the components of the system of FIGS. 1A-1C, and/or other components not shown therein.

At operation 300, it may be identified, by a management controller of a data processing system, that a second data processing system is out of synchronization with a wireless connection profile established by hardware resources hosted by the first data processing system. It may be identified by that the second data processing system is out of synchronization by: (i) obtaining a synchronization status for the wireless connection profile stored in a cache hosted by the management controller, (ii) performing a comparison between versions of the wireless connection profile hosted by the first and second data processing systems, and/or any other methods.

At operation 302, the wireless connection profile may be securely transmitted to the second data processing system. The wireless connection profile may be securely transmitted by: (i) obtaining a public key of a public-private key pair controlled by the second data processing system, (ii) providing an encrypted copy of the wireless connection profile, (iii) transmitting the encrypted copy of the wireless connection profile over an out-of-band communication channel, and/or any other process. Transmitting the encrypted copy of the wireless connection profile may include: (i) sending, by the management controller, a data package (e.g., the encrypted copy of the wireless connection profile, control instructions, etc.) to a network module of the first data processing system, (ii) directing, by the network module, the data package to a component of the second data processing system (e.g., a network module hosted by the second data processing system, hardware resources of the second data processing system, etc.), and/or any other processes.

The method may end following operation 302.

Using the method shown in FIG. 3A, additional data processing systems in a distributed environment may seamlessly establish a shared wireless connection with a first data processing system while cooperatively providing computer-implemented services.

Turning to FIG. 3B, a second flow diagram illustrating a method of synchronizing wireless connection profiles between hardware resources of a data processing system and a management controller of the data processing system. The method may be performed, for example, by any of the components of the system of FIGS. 1A-1C, and/or other components not shown therein.

At operation 310, wireless connection profiles may be established by hardware resources of the data processing system for use in wireless communications. The wireless connection profiles may be established by: (i) provisioning an initial connection to a wireless network, (ii) creating a profile to store information relevant to establishing a future wireless connection to the wireless network (e.g., credentials, SSID, security settings, etc.), (iii) storing the profile as a data structure (e.g., an extensible markup language file) within hardware resources (e.g., an operating system) of the data processing system, and/or any other process.

At operation 312, a cache may be securely synchronized with the wireless connection profiles. The cache may be securely synchronized by: (i) capturing the wireless network profiles established by the hardware resources, (ii) securely transmitting the wireless network profiles to the management controller via an out-of-band communication channel, and/or any other methods. The wireless network profiles may be captured by: (i) enumerating, by an operating system agent hosted in the hardware resources, the wireless connection profiles stored in the hardware resources, (ii) performing an API function to retrieve information regarding each of the wireless connection profiles, (iii) identifying the wireless connection profiles that may be supported by the management controller, and/or any other processes.

At operation 314, usage metrics may be obtained for the wireless connection profiles stored in the cache. The usage metrics may be obtained by: (i) monitoring activity of each wireless connection profile (e.g., when most recently used to establish a wireless connection, a number of times a wireless connection is used to establish a wireless connection), (ii) obtaining an event log of a component of the data processing system that may establish wireless connections (e.g., a network module), (iii) requesting data from other entities (e.g., hardware resources of the data processing system, a second data processing system, etc.) that may use the wireless connection profiles, and/or any other methods At operation 316, the wireless connection profiles stored in the cache may be prioritized based on the usage metrics. The wireless connection profiles may be prioritized by: (i) comparing usage metrics of each wireless connection profile, (ii) determining a level of usage of each wireless connection profile (e.g., a wireless connection profile with a more recent usage may indicate a higher level of usage than a wireless connection profile with a less recent usage, a wireless connection profile with a higher usage count may indicate a higher level of usage than a wireless connection profile with a lower usage count, etc.), (iii) using an inference model to predict a likelihood of future use of a wireless connection profile (e.g., based on a function of the usage metrics), and/or any other process.

The method may end following operation 316.

Using the method shown in FIG. 3B, a management controller of a data processing system may maintain a cache with wireless connection profiles synchronized with hardware resources of the data processing system. By doing so, the management controller may be able to provide management services for the data processing system via out-of-band methods while utilizing a shared wireless connection.

Figure 4:
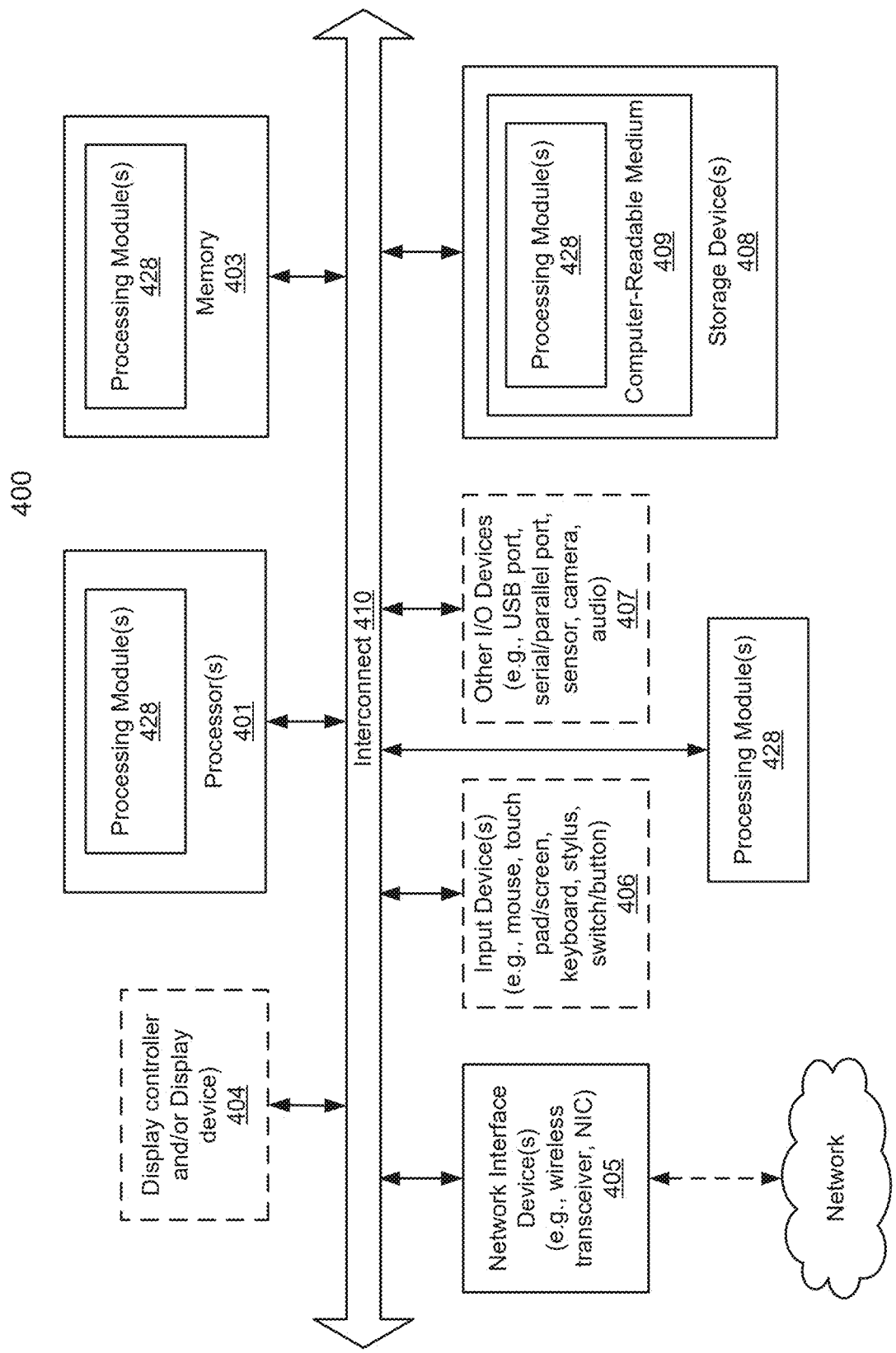
FIG. 4 shows a block diagram illustrating a data processing system in accordance with an embodiment.

Any of the components illustrated in FIGS. 1A-2C may be implemented with one or more computing devices. Turning to FIG. 4, a block diagram illustrating an example of a data processing system (e.g., a computing device) in accordance with an embodiment is shown. For example, system 400 may represent any of data processing systems described above performing any of the processes or methods described above. System 400 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 400 is intended to show a high level view of many components of the computer system. However, it is to be understood that additional components may be present in certain implementations and furthermore, different arrangement of the components shown may occur in other implementations. System 400 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 400 includes processor 401, memory 403, and devices 405-407 via a bus or an interconnect 410. Processor 401 may represent a single processor or multiple processors with a single processor core or multiple processor cores included therein. Processor 401 may represent one or more general-purpose processors such as a microprocessor, a central processing unit (CPU), or the like. More particularly, processor 401 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 401 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 401, which may be a low power multi-core processor socket such as an ultra-low voltage processor, may act as a main processing unit and central hub for communication with the various components of the system. Such processor can be implemented as a system on chip (SoC). Processor 401 is configured to execute instructions for performing the operations discussed herein. System 400 may further include a graphics interface that communicates with optional graphics subsystem 404, which may include a display controller, a graphics processor, and/or a display device.

Processor 401 may communicate with memory 403, which in one embodiment can be implemented via multiple memory devices to provide for a given amount of system memory. Memory 403 may include one or more volatile storage (or memory) devices such as random access memory (RAM), dynamic RAM (DRAM), synchronous DRAM (SDRAM), static RAM (SRAM), or other types of storage devices. Memory 403 may store information including sequences of instructions that are executed by processor 401, or any other device. For example, executable code and/or data of a variety of operating systems, device drivers, firmware (e.g., input output basic system or BIOS), and/or applications can be loaded in memory 403 and executed by processor 401. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 400 may further include IO devices such as devices (e.g., 405, 406, 407, 408) including network interface device(s) 405, optional input device(s) 406, and other optional IO device(s) 407. Network interface device(s) 405 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 406 may include a mouse, a touch pad, a touch sensitive screen (which may be integrated with a display device of optional graphics subsystem 404), a pointer device such as a stylus, and/or a keyboard (e.g., physical keyboard or a virtual keyboard displayed as part of a touch sensitive screen). For example, input device(s) 406 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 407 may include an audio device. An audio device may include a speaker and/or a microphone to facilitate voice-enabled functions, such as voice recognition, voice replication, digital recording, and/or telephony functions. Other IO devices 407 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 407 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 410 via a sensor hub (not shown), while other devices such as a keyboard or thermal sensor may be controlled by an embedded controller (not shown), dependent upon the specific configuration or design of system 400.

To provide for persistent storage of information such as data, applications, one or more operating systems and so forth, a mass storage (not shown) may also couple to processor 401. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as an SSD cache to enable non-volatile storage of context state and other such information during power down events so that a fast power up can occur on re-initiation of system activities. Also a flash device may be coupled to processor 401, e.g., via a serial peripheral interface (SPI). This flash device may provide for non-volatile storage of system software, including a basic input/output software (BIOS) as well as other firmware of the system.

Storage device 408 may include computer-readable storage medium 409 (also known as a machine-readable storage medium or a computer-readable medium) on which is stored one or more sets of instructions or software (e.g., processing module, unit, and/or processing module/unit/logic 428) embodying any one or more of the methodologies or functions described herein. Processing module/unit/logic 428 may represent any of the components described above. Processing module/unit/logic 428 may also reside, completely or at least partially, within memory 403 and/or within processor 401 during execution thereof by system 400, memory 403 and processor 401 also constituting machine-accessible storage media. Processing module/unit/logic 428 may further be transmitted or received over a network via network interface device(s) 405.

Computer-readable storage medium 409 may also be used to store some software functionalities described above persistently. While computer-readable storage medium 409 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of embodiments disclosed herein. The term "computer-readable storage medium" shall accordingly be taken to include, but not be limited to, solid-state memories, and optical and magnetic media, or any other non-transitory machine-readable medium.

Processing module/unit/logic 428, components and other features described herein can be implemented as discrete hardware components or integrated in the functionality of hardware components such as ASICS, FPGAs, DSPs or similar devices. In addition, processing module/unit/logic 428 can be implemented as firmware or functional circuitry within hardware devices. Further, processing module/unit/logic 428 can be implemented in any combination hardware devices and software components.

Note that while system 400 is illustrated with various components of a data processing system, it is not intended to represent any particular architecture or manner of interconnecting the components; as such details are not germane to embodiments disclosed herein. It will also be appreciated that network computers, handheld computers, mobile phones, servers, and/or other data processing systems which have fewer components or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

What is claimed is:

1. A method of managing a data processing system for shared wireless connection operation, the method comprising:
    identifying, by a management controller of the data processing system, that a second data processing system is out of synchronization with a wireless connection profile established by hardware resources hosted by the data processing system, the second data processing system being unable to use the wireless connection profile while out of synchronization;
    based on the identifying:
        securely transmitting, via an out-of-band communication channel, the wireless connection profile to the second data processing system to synchronize the second data processing system so that the second data processing system and the data processing system both utilize a shared wireless connection profile in operation.

2. A method of claim 1, wherein securely transmitting the wireless connection profile comprises:
    obtaining, by the management controller, a public key of a public-private key pair controlled by the second data processing system; and
    providing, by the management controller of the data processing system and via an out-of-band communication channel, an encrypted copy of the wireless connection profile to the second data processing system, the encrypted copy being encrypted using the public key.

3. A method of claim 1, further comprising:
    prior to identifying that the second data processing system is out of synchronization with the wireless connection profile:
        establishing, by the hardware resources, wireless connection profiles for use in wireless communications; and
        securely synchronizing, by the management controller, a cache with the wireless connection profiles.

4. The method of claim 3, wherein the wireless connection profiles are securely synchronized via a capturing process using an agent hosted by the hardware resources.

5. The method of claim 3, wherein the cache is hosted by the management controller.

6. The method of claim 5, further comprising:
    obtaining, by the management controller, usage metrics for the wireless connection profiles stored in the cache; and
    prioritizing, by the management controller, the wireless connection profiles stored in the cache based on the usage metrics.

7. A method of claim 6, wherein the usage metrics comprise at least one type of metric selected from a group of types of metrics consisting of:
    a time of most recent usage; and
    a usage count.

8. A method of claim 7, wherein the cache is finite, and the cache has a cache ejection policy that is keyed to the prioritizing of the wireless connection profiles so that lower prioritized wireless connection profiles are preferentially ejected when new wireless connection profiles are obtained and the cache is full.

9. The method of claim 1, wherein the data processing system comprises hardware resources and a network module adapted to separately advertise network endpoints for the management controller and the hardware resources of the data processing system, the network endpoints being usable by a server system to address communications to the hardware resources using an in-band communication channel and the management controller using an out-of-band communication channel.

10. The method of claim 9, wherein the management controller and the network module are on separate power domains from the hardware resources so that the management controller and the network module are operable while the hardware resources are inoperable.

11. The method of claim 9, wherein the out-of-band communication channel runs through the network module, and an in-band communication channel that services the hardware resources also runs through the network module.

12. The method of claim 9, wherein the network module hosts a transmission control protocol/internet protocol (TCP/IP) stack to facilitate network communications via the out-of-band communication channel.

13. A non-transitory machine-readable medium having instructions stored therein, which when executed by a processor, cause the processor to perform operations for managing a data processing system for shared wireless connection operation, the operations comprising:
    identifying, by a management controller of the data processing system, that a second data processing system is out of synchronization with a wireless connection profile established by hardware resources hosted by the data processing system, the second data processing system being unable to use the wireless connection profile while out of synchronization;
    based on the identifying:
        securely transmitting, via an out-of-band communication channel, the wireless connection profile to the second data processing system to synchronize the second data processing system so that the second data processing system and the data processing system both utilize a shared wireless connection profile in operation.

14. The non-transitory machine-readable medium of claim 13, wherein securely transmitting the wireless connection profile comprises:
    obtaining, by the management controller, a public key of a public-private key pair controlled by the second data processing system; and
    providing, by the management controller of the data processing system and via an out-of-band communication channel, an encrypted copy of the wireless connection profile to the second data processing system, the encrypted copy being encrypted using the public key.

15. The non-transitory machine-readable medium of claim 13, wherein the operations further comprise:
    prior to identifying that the second data processing system is out of synchronization with the wireless connection profile:
        establishing, by the hardware resources, wireless connection profiles for use in wireless communications; and
        securely synchronizing, by the management controller, a cache with the wireless connection profiles.

16. The non-transitory machine-readable medium of claim 15, wherein the wireless connection profiles are securely synchronized via a capturing process using an agent hosted by the hardware resources.

17. A data processing system, comprising:
a processor; and
a memory coupled to the processor to store instructions, which when executed by the processor, cause the processor to perform operations for managing the data processing system for shared wireless connection operation, the operations comprising:
identifying, by a management controller of the data processing system, that a second data processing system is out of synchronization with a wireless connection profile established by hardware resources hosted by the data processing system, the second data processing system being unable to use the wireless connection profile while out of synchronization;
based on the identifying:
securely transmitting, via an out-of-band communication channel, the wireless connection profile to the second data processing system to synchronize the second data processing system so that the second data processing system and the data processing system both utilize a shared wireless connection profile in operation.

18. The data processing system of claim 17, wherein securely transmitting the wireless connection profile comprises:

obtaining, by the management controller, a public key of a public-private key pair controlled by the second data processing system; and
providing, by the management controller of the data processing system and via an out-of-band communication channel, an encrypted copy of the wireless connection profile to the second data processing system, the encrypted copy being encrypted using the public key.

19. The data processing system of claim 17, wherein the operations further comprise:
prior to identifying that the second data processing system is out of synchronization with the wireless connection profile:
establishing, by the hardware resources, wireless connection profiles for use in wireless communications; and
securely synchronizing, by the management controller, a cache with the wireless connection profiles.

20. The data processing system of claim 19, wherein the wireless connection profiles are securely synchronized via a capturing process using an agent hosted by the hardware resources.

* * * * *